(12) United States Patent
Kleiss et al.

(10) Patent No.: US 8,471,144 B2
(45) Date of Patent: Jun. 25, 2013

(54) ADAPTER BOX FOR PROTECTION OF THE ELECTRICAL CONNECTION OF A PHOTOVOLTAIC MODULE

(75) Inventors: Gerhard Kleiss, Bonn (DE); Philipp Handrick, Bonn (DE)

(73) Assignee: Solarworld AG (DE)

( * ) Notice: Subject to any disclaimer, the term of this patent is extended or adjusted under 35 U.S.C. 154(b) by 225 days.

(21) Appl. No.: 12/899,233

(22) Filed: Oct. 6, 2010

(65) Prior Publication Data

US 2012/0085565 A1  Apr. 12, 2012

(51) Int. Cl.
*H02G 3/08* (2006.01)
(52) U.S. Cl.
USPC ............... 174/50; 174/520; 174/61; 220/3.2; 220/4.02; 439/718
(58) Field of Classification Search
USPC ............... 174/50, 520, 53, 54, 58, 61, 63, 51, 174/60, 64; 220/3.2–3.9, 4.02; 248/906, 200; 439/76.1, 76.2, 142, 718, 535, 709; 136/243, 136/244
See application file for complete search history.

(56) References Cited

U.S. PATENT DOCUMENTS

| | | | | |
|---|---|---|---|---|
| 4,460,232 | A * | 7/1984 | Sotolongo | 439/535 |
| 6,655,987 | B2 * | 12/2003 | Higashikozono et al. | 439/535 |
| 7,097,516 | B2 * | 8/2006 | Werner et al. | 439/709 |
| 7,432,439 | B2 * | 10/2008 | Takada et al. | 174/50 |
| 7,444,743 | B2 * | 11/2008 | Feldmeier et al. | 439/76.2 |
| 7,763,807 | B2 * | 7/2010 | Richter | 439/718 |
| 7,914,298 | B2 * | 3/2011 | Lauermann et al. | 439/76.1 |
| 7,939,754 | B2 * | 5/2011 | Richter et al. | 174/50 |
| 7,960,650 | B2 * | 6/2011 | Richter et al. | 174/50 |
| 8,003,885 | B2 * | 8/2011 | Richter et al. | 174/50 |
| 8,222,533 | B2 * | 7/2012 | Gherardini et al. | 439/76.1 |

* cited by examiner

*Primary Examiner* — Angel R Estrada
(74) *Attorney, Agent, or Firm* — Cantor Colburn LLP

(57) ABSTRACT

An adapter box for the protection of the electrical connection of a photovoltaic module is attachable by form-fit to an electrical junction box of the photovoltaic module. At least one side of the adapter box comprises openings for inserting protective conduits in which cables run through for being connected to electrical connectors of the junction box, the adapter box further comprising at least one opening for said connectors.

20 Claims, 4 Drawing Sheets

ADAPTER BOX FOR PROTECTION OF THE ELECTRICAL CONNECTION OF A PHOTOVOLTAIC MODULE

BACKGROUND OF THE INVENTION

Field of the Invention

The invention concerns the field of solar panels or rather voltaic modules and particularly the protection of the electrical connection of photovoltaic modules.

A photovoltaic module generally consists of interconnected solar cells and is also known as a solar panel. Such solar panels are used to generate electricity. For the electrical connection, the solar panel is provided with an electrical junction box usually having two connectors. In some countries, particularly the US, and parts of Latin America, the cables that are used to connect an off-grid solar panel via the junction box are required to be protected against external damage. The protection is achieved by a tube, also called a conduit, which surrounds the cable. Usually plastic or steel tubes are used as conduits. The cables have to be protected from the junction box along the whole length of the cable.

Manufacturers of off grid photovoltaic modules that are intended for the use in countries without the above described protection requirements usually provide the photovoltaic module with a flat electrical junction box allowing only the connection of the cable itself whereas there exists no possibility of also attaching a surrounding protective conduit to the junction box. The safety requirements in the US and other countries can therefore not be fulfilled with those photovoltaic modules.

The junction box of a photovoltaic module intended for the US market is usually bigger allowing for the direct attachment of the conduits to the junction box. Although photovoltaic modules with those bigger junction boxes are suitable for both the US market and Latin America, as well as other countries without the above described safety requirements, they offer some disadvantages. The production costs for bigger junction boxes are higher compared to the production of flat junction boxes due to more material needed. If the photovoltaic module is stored in an upright position, for example, during installation of the photovoltaic module, there is high risk that the module will be damaged if it accidentally tilts onto the junction box. The biggest disadvantage of bigger junction boxes is that the photovoltaic modules require more space during transportation.

It is therefore an object of the present invention to find both a simple and cheap solution of using existing photovoltaic modules with flat junction boxes and fulfilling the safety requirements in the US and Latin America at the same time. It is also an object of the present invention to overcome the disadvantages that are known from the state-of-the-art.

BRIEF SUMMARY OF THE INVENTION

According to the present invention an adapter box for the protection of the electrical connection of the photovoltaic module is provided, wherein the adapter box is attachable to an electrical junction box of the photovoltaic module and/or to the photovoltaic module itself, the adapter box on at least one side thereof comprising openings for inserting protective conduits in which cables are run through being connected to electrical connectors of the junction box, and the adapter box further comprising at least one opening for said connectors. This construction offers a big advantage that photovoltaic modules with a flat junction box may be used for the US market, fulfilling the requirement of cable protection and at the same time offering the advantages of low production costs, safe installation and low transport volume. It is pointed out that the box is usually hollow and may be square shaped, round or may also have any other geometry. In one aspect, the adapter box may be attachable by a form fit to the electrical junction box.

Other aspects of the invention are described below.

According to one aspect of the present invention, the adapter box comprises a base, a top and a wall with a front and a back, said at least one opening for said connectors each being formed as a recess in said back of the wall, the recess extending from the base toward the top. This simplifies attaching the box to the back side of the photovoltaic module if the box is put with its base onto the backside of the module.

According to another aspect of the present invention, the adapter box comprises a separate recess for each connector, wherein the width of each recess corresponds to a diameter of a respective connector. This helps to prevent dirt from entering the adapter box through the recesses.

According to another aspect of the present invention, the base of the adapter box is substantially apertured. Thus, attaching the adapter box onto the backside of the photovoltaic module and at the same time covering the connectors of the junction box is thus further simplified.

According to yet another aspect of the present invention, the base comprises a base plate extending substantially away from the wall of the adapter box. The base plate may be used to affix the adapter box to the backside of the solar panel.

The base plate may therefore be provided with an adhesive strip. It is pointed out that the base plate may also have holes formed therein such that screws or rivets may be used to affix the adapter box to the solar panel. Alternatively, the plate may also be glued onto the photovoltaic module and/or the junction box, for example, using a silicon adhesive.

According to another aspect of the present invention, the adapter box comprises a base, a top and a wall with a front and a back wherein the top is substantially apertured and the adapter box further comprises a cover plate to be received on the top. This simplifies the process of electrically connecting the photovoltaic module and attaching the adapter box to module and junction box. Cables may be connected and disconnected to or from the connectors of the junction box through the aperture in the top of the box even with the adapter box already attached to the solar panel. If the connection process is finished, the adapter box can be closed with the cover plate. The cover plate may be releaseably connected to the adapter box, for example, with screws and/or clips.

According to another aspect of the present invention, the diameter of the openings for inserting protective conduits corresponds to the outer diameter of the conduits. This helps to prevent dirt from entering the adapter box through these openings.

According to another aspect of the invention, the adapter box comprises a base, a top and a wall with a front, a back and two side walls, wherein the openings for inserting the protective conduits are pre-perforated in the front and/or the side walls to be selectively stamped out. This offers a big advantage in that a person installing the photovoltaic module can decide which of the pre-perforated openings are to be used and thus in which direction the cables and corresponding conduits are directed from the adapter box.

According to another aspect of the present invention, the adapter box further comprises brackets for coupling the adapter box to the junction box wherein the brackets are releaseably engageable with respective retaining elements of the junction box. This constitutes a very easy and cheap option to attach the adapter box to the junction box.

According to yet another aspect of the present invention, the brackets are extensions of side walls of the box and extend substantially perpendicular away from the back of the adapter box.

According to another aspect of the present invention, the brackets comprise at least one fixing lug that is engageable with a retaining element of the junction box.

It may also be advantageous if the brackets comprise an indentation if the junction box also shows indentations such that the indentations of the brackets can engage the indentations of the junction box.

The present invention also provides a photovoltaic module with an electrical junction box for the electrical connection of the photovoltaic module, and an adapter box being attached to the junction box, the adapter box on at least one side thereof comprising openings for inserting protective conduits in which cables are run through being connected to electric connectors of the junction box, and the adapter box further comprising at least one opening for said connectors.

The invention further provides a method for electrically connecting a photovoltaic module wherein the method comprises the steps of: providing a photovoltaic module comprising an electrical junction box with connectors; providing cables and protective conduits; providing an adapter box being attachable to the electrical junction box, the adapter box on at least one side thereof comprising openings for inserting protective conduits, and the adapter box further comprising at least one opening for said connectors; pulling the cables through the conduits and the adapter box; connecting the cables to the connectors; positioning the adapter box and affixing the adapter box to the photovoltaic module. This method offers a very flexible option for installing solar panels with a junction box that a protective conduit cannot be directly connected to and at the same time fulfilling the safety requirements in the US and certain countries in Latin America.

According to an aspect of the present invention, the method may also comprise the step of affixing the conduits to the adapter box such that a reliable protection of the cables is further improved.

A very easy and cheap solution for affixing the adapter box to the photovoltaic module can be achieved with adhesive bonding.

A preferred embodiment of the invention is hereinafter described in more detail by means of drawings.

DETAILED DESCRIPTION OF THE INVENTION

Figure 1:
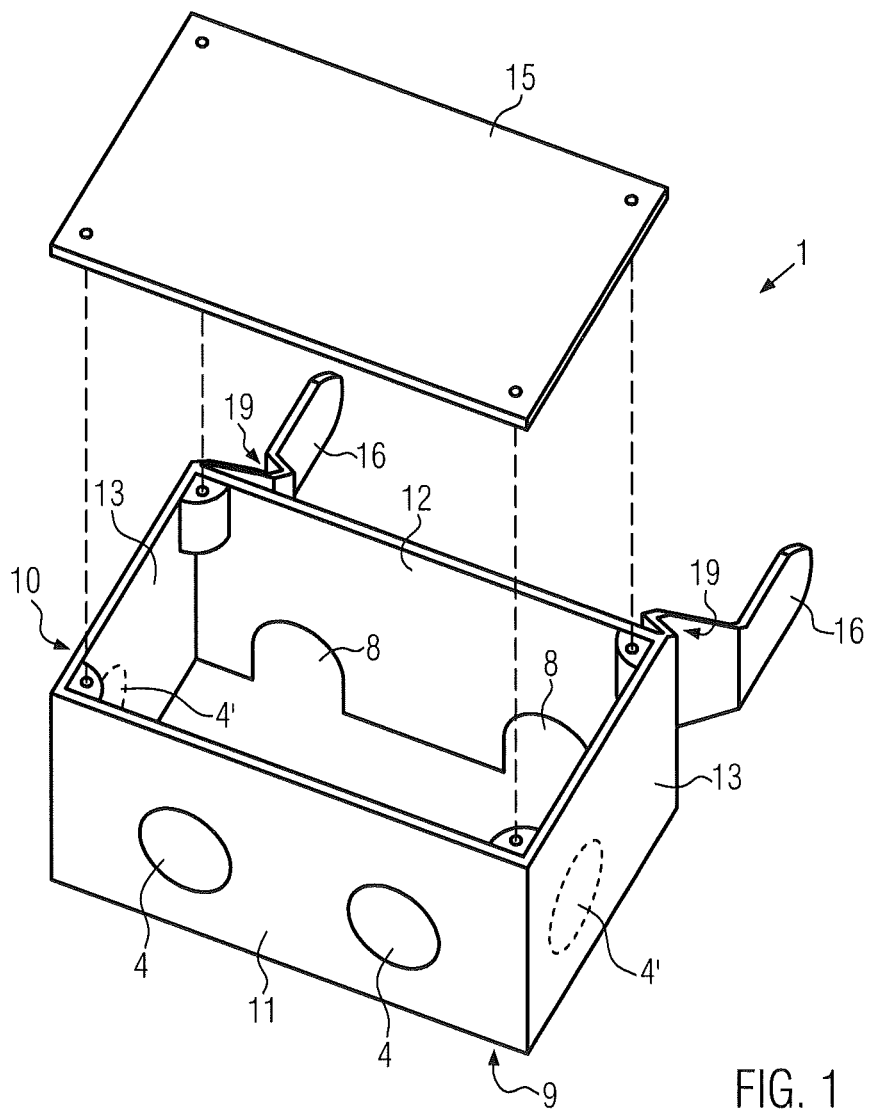
FIG. 1 shows a perspective view of an adapter box according to the invention.

The same reference numerals refer to the same parts throughout the various figures.

Figure 3:
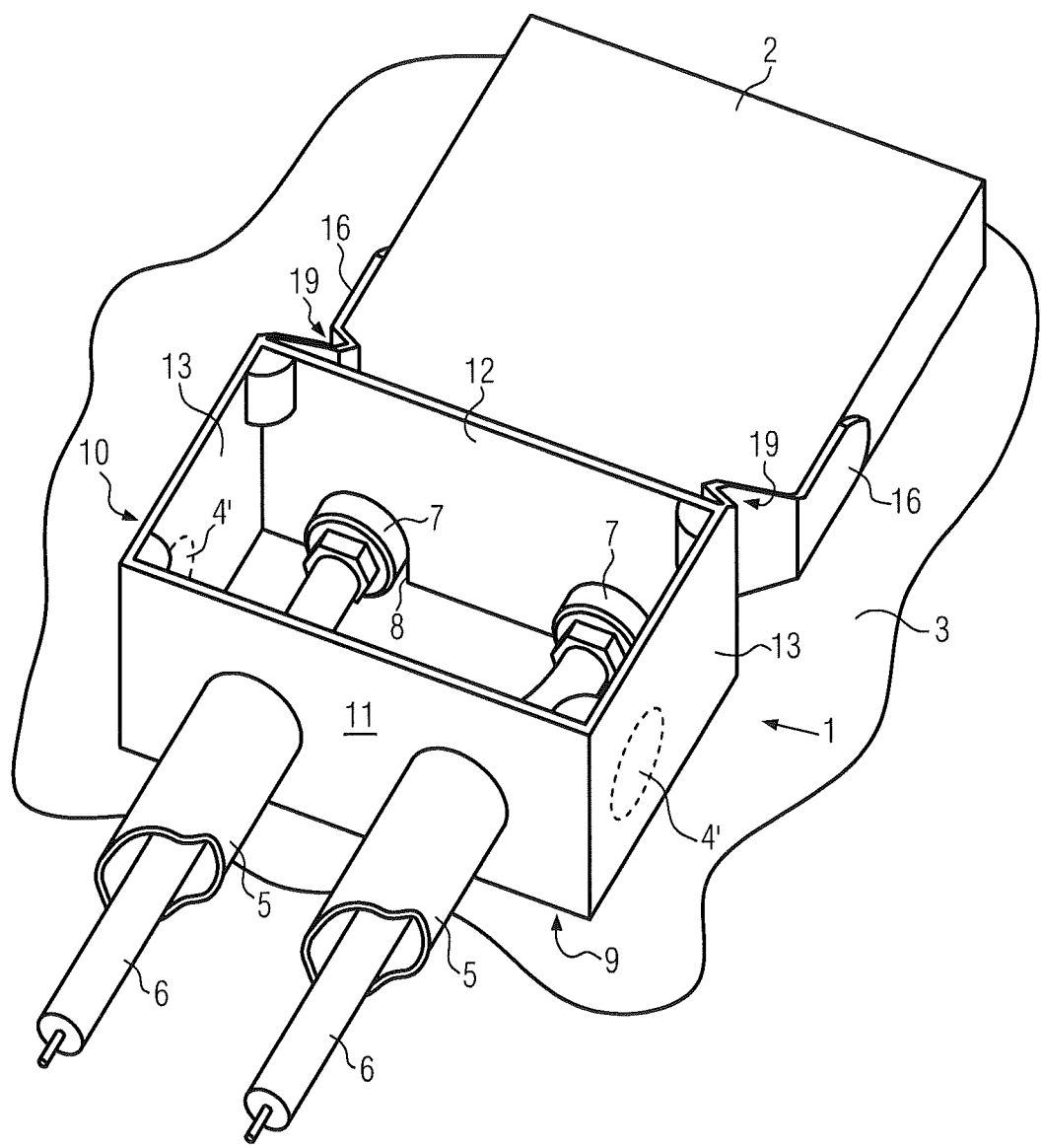
FIG. 3 is a perspective of the adapter box from FIGS. 1 and 2 installed and attached to the junction box of a photovoltaic module.

FIG. 1 shows an adapter box 1 according to the present invention. The adapter box 1 is substantially square-shaped and has a base 9, a top 10, a front wall 11, a back wall 12 and two side walls 13. Base 9 and top 10 are substantially open and the top can be closed with cover plate 15. The adapter box 1 comprises four pre-perforated openings for inserting protective conduits 5 as shown in FIG. 3. The pre-perforated openings 4 in the front 11 of the adapter box 1 have been stamped out whereas the pre-perforated openings 4' in the side walls 13 of the shown example adapter box are not used such that the side walls 13 are closed. Depending on the installation requirement, the pre-perforated openings 4' in the side walls 13 can be stamped out instead of the openings 4 in the front.

The back wall 12 of the adapter box 1 comprises two recesses 8 that extend from the base 9 of the adapter box towards the top 10. As best shown in FIG. 3, the recesses 8 are formed to receive the electrical connectors 7 of the junction box 2 on the back side 3 of a photovoltaic module. The width of the recesses 8 correspond to the diameter of the PG glands that are used as connectors 7 in the shown embodiment of FIG. 3.

Figure 2:
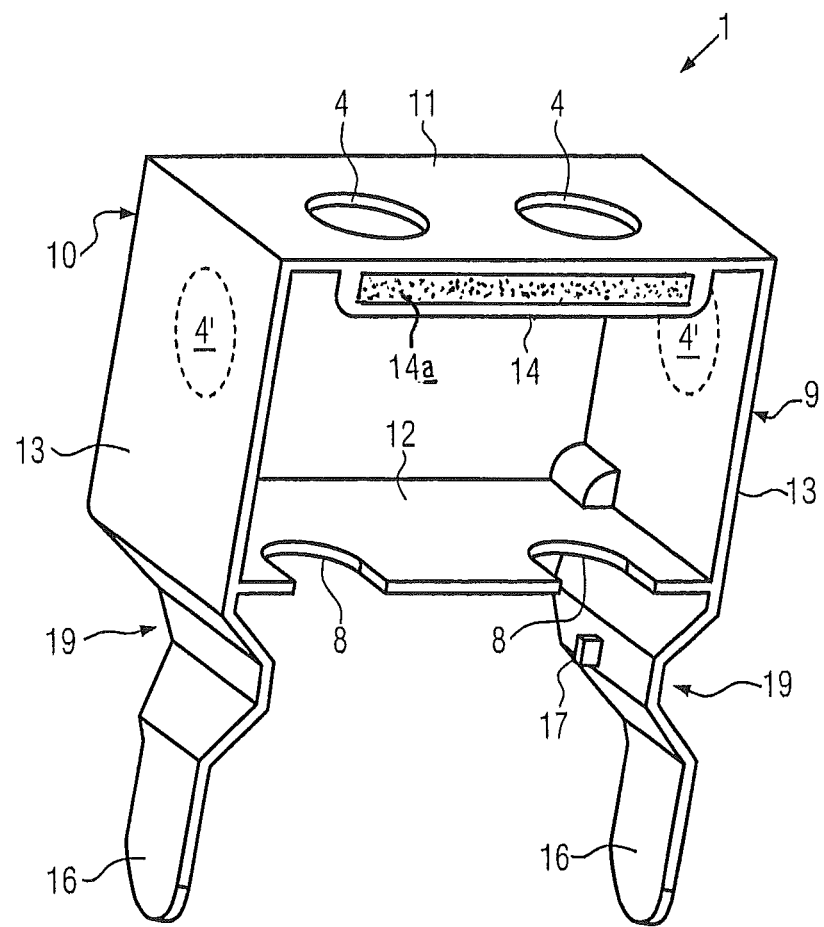
FIG. 2 is a perspective bottom view of the adapter box in FIG. 1.

As can be seen in FIG. 2, although the base 9 of the adapter box 1 is substantially open, the base 9 comprises a base plate 14 extending perpendicularly away from the front wall 11 of the adapter box 1. An adhesive strip 14a can be attached to the base plate 14 for affixing the adapter box 1 onto the back side 3 of the solar panel.

Figure 4:
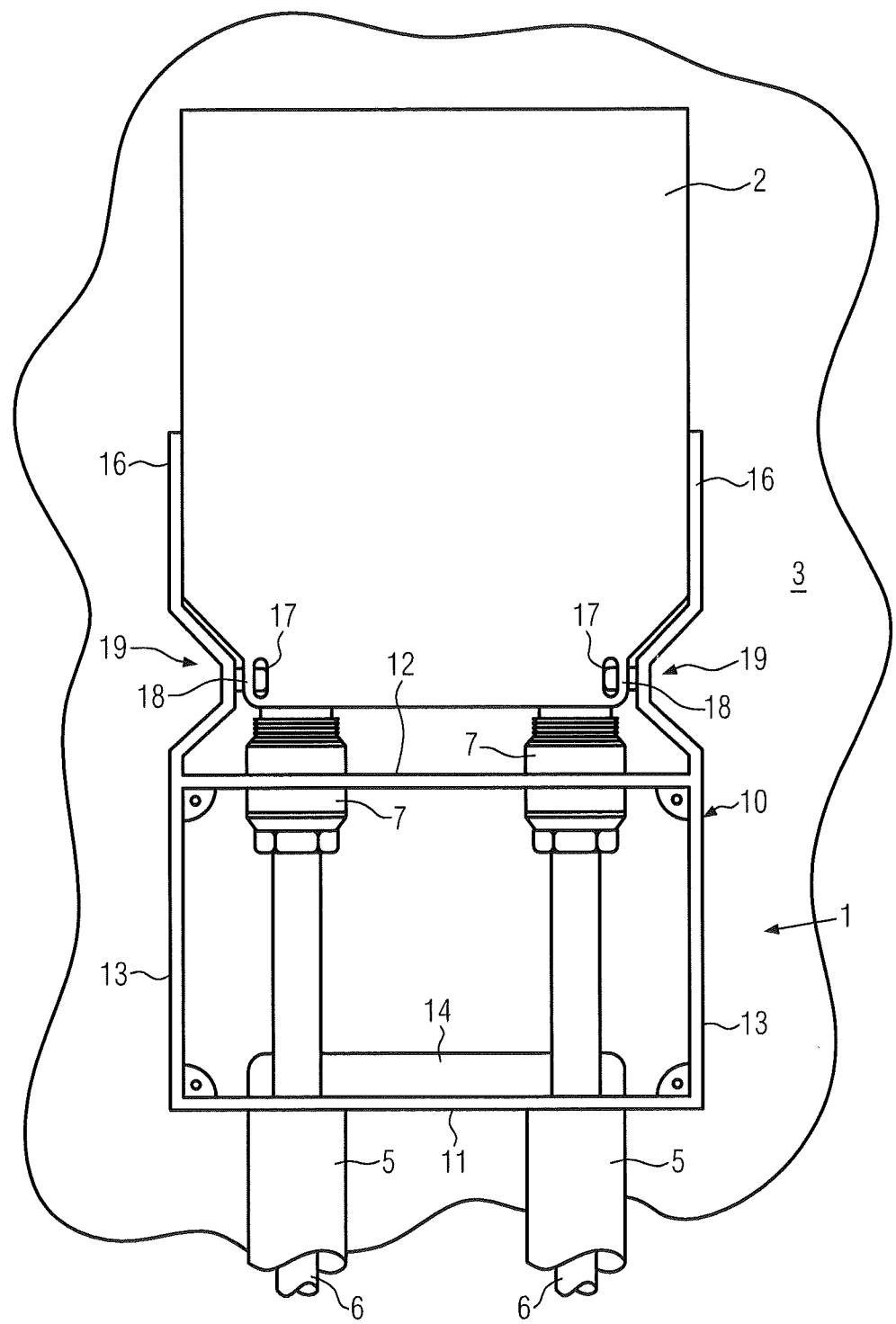
FIG. 4 is a top view of the installed adapter box from FIG. 3.

FIGS. 3 and 4 show the adapter box 1 installed to the junction box on the back side 3 of the photovoltaic module. The adapter box 1 comprises two brackets 16 for attachment of the adapter box 1 to the junction box 2. The two brackets 16 are extensions of the side walls 13 and extend substantially away from the back wall 12 of the adapter box 1. Indentations 19 in the brackets 16 engage corresponding indentations (unnumbered) of the junction box 2. As shown in FIGS. 2 and 4, each of the brackets 16 comprises a fixing lug 17 engaging a corresponding retaining element 18 of the junction box.

As shown in FIGS. 3 and 4, the cables 6 are connected to the PG glands of the electrical junction box 2 and run through the openings 4 in the front 11 of the adapter box 1. Outside the adapter box the cables 6 are protected by protective conduits 5 made of steel or plastic materials. The conduits 5 are attached to the adapter box 1 for maximum protection.

INSTALLATION OF THE SOLAR PANEL USING AN ADAPTER BOX ACCORDING TO THE INVENTION

The connecting cables 6 are loosely pulled through the protective conduits and the adapter box 1 and then connected to the PG glands 7 of the electrical junction box 2. In a next step, the PG glands are tightened. The adapter box 1 is then positioned on the back side 3 of the photovoltaic module and affixed to the photovoltaic module and/or the junction box 2. The attachment may be achieved via an adhesive strip between base plate 14 of the adapter box 1 and back side 3 of the photovoltaic module. Alternatively, adhesive bonding, for example, using silicon adhesive as well as a bolted connection between adapter box 1 and the back side 3 of the photovoltaic module are possible. Attachment of the adapter box 1 to the junction box 2 can also be achieved via the above described brackets and fixing lugs. In a next step, the conduits 5 are attached to the adapter box 1. After fixation and assembly of all needed elements, the adapter box is closed with the cover plate 15 for providing protection of the cables 6. The cover plate 15 may be connected to the adapter box 1 with screws or clips or similar fasteners or fixing devices.

What is claimed is:

1. An adapter box for protection of the electrical connection of a photovoltaic module, wherein the adapter box is attachable to an electrical junction box of such photovoltaic module, the adapter box comprising on at least one side thereof conduit openings for receiving protective conduits through which cables can be run for connection of such cables to electrical connectors of such junction box, and wherein (a) the adapter box is configured to space the conduit openings a distance from such electrical connectors when the adapter box is attached to such junction box, and (b) the adapter box further comprises at least one connector opening for such electrical connectors, whereby such cables can run through such protective conduits and extend therefrom within the adapter box for connection therein to such electrical connectors via the at least one opening.

2. The adapter box according to claim 1, wherein said at least one connector opening for said electrical connectors is formed as an opening on a side of the adapter box which, when connected to such junction box, faces towards such junction box.

3. The adapter box of claim 2, wherein the connector opening extends over the full area of the side of the adapter box which faces towards such junction box.

4. The adapter box according to claim 2, wherein the adapter box comprises a separate connector opening for each connector, the width of each connector opening corresponding to the diameter of a respective connector.

5. The adapter box according to claim 1, wherein such photovoltaic module has a back side, and the adapter box comprises a base, a top and side walls, the base defining a base opening which faces towards the back side of such photovoltaic module when the adapter box is attached to such electrical junction box.

6. The adapter box of claim 5, wherein the base opening extends over the full area of the base.

7. The adapter box according to claim 1, wherein the adapter box comprises a base, a top, a front wall and side walls, and the base comprises a base plate extending in a direction away from the front wall.

8. The adapter box according to claim 7, wherein the base plate is provided with an adhesive strip for affixing the adapter box to the photovoltaic module.

9. The adapter box according to claim 1, wherein the adapter box comprises a base, a top and side walls, the top defining a top opening and the adapter box further comprising a cover plate to be received on said top.

10. The adapter box according to claim 1, wherein the respective inner diameters of said conduit openings for receiving such protective conduits corresponds to the outer diameter of said conduits.

11. The adapter box according to claim 1, wherein the adapter box comprises a base, a top and a wall comprised of a front wall, a back wall and two side walls, said conduit openings for inserting said protective conduits being pre-perforated in one or more of the front wall and the side walls whereby said openings may be selectively stamped out.

12. The adapter box according to claim 1, further comprising brackets for coupling the adapter box to such junction box, the brackets being removably fixed to such junction box by retaining elements on such junction box.

13. The adapter box according to claim 12, wherein the adapter box comprises a base, a top and a wall comprising a front wall, a back wall and two side walls, the brackets being extensions of said side walls and extending substantially perpendicularly away from the back wall.

14. The adapter box according to claim 12, wherein each of said brackets comprises at least one fixing lug being engageable with one of such retaining elements on such junction box.

15. The adapter box according to claim 12, wherein each of said brackets is configured to define therein an indentation.

16. An adapter box for protection of the electrical connection of a photovoltaic module, wherein the adapter box is attachable to an electrical junction box of such photovoltaic module, the adapter box comprising on at least one side thereof conduit openings for inserting protective conduits through which cables may run for connection to electrical connectors of such junction box, the adapter box further comprising at least one connector opening for said connectors and further comprising brackets for coupling the adapter box to the junction box, the brackets being fixed removably with retaining elements to the junction box.

17. The adapter box according to claim 16, wherein the adapter box comprises a base, a top and a wall comprised of a front wall, a back wall and two side walls, the brackets being extensions of said side walls and extending substantially perpendicularly away from the back of said wall.

18. The adapter box according to claim 16, wherein each of said brackets comprises at least one fixing lug being engageable with one of said retaining elements.

19. The adapter box according to claim 16, wherein each of said brackets is configured to define therein an indentation.

20. A photovoltaic module having an electrical junction box comprising electrical connectors for electrical connection of the photovoltaic module, and an adapter box attached to the junction box, the adapter box on at least one side thereof comprising conduit openings for receiving protective conduits through which cables can be run for connection to the electrical connectors of the junction box, and (a) the adapter box is configured to space the conduit openings a distance from the electrical connectors, and (b) the adapter box further comprising at least one connector opening for said connectors, whereby such cables can be enclosed within such protective conduits and extend therefrom within the adapter box for connection therein to such electrical connectors via the at least one opening.

* * * * *